United States Patent [19]

Panzer et al.

[11] 4,299,939

[45] Nov. 10, 1981

[54] HOMOPOLYMERS AND COPOLYMERS OF 2-ALKENYLIMIDAZOLE OR ITS 1,3-DIALKYL-2-ALKENYLIMIDAZOLIUM SALTS

[75] Inventors: Hans P. Panzer, Stamford; Alan S. Rothenberg, East Norwalk; Paul F. Cutrufello, Bridgeport, all of Conn.

[73] Assignee: American Cyanamid Company, Stamford, Conn.

[21] Appl. No.: 163,916

[22] Filed: Jun. 30, 1980

[51] Int. Cl.³ ............................................ C08F 26/06
[52] U.S. Cl. .................................................. 526/258
[58] Field of Search .................... 526/262, 258, 263

[56] References Cited

U.S. PATENT DOCUMENTS

| | | | |
|---|---|---|---|
| 3,406,139 | 10/1968 | Hurwitz et al. | 526/258 |
| 3,812,084 | 5/1974 | Williams et al. | 526/258 |
| 3,826,787 | 7/1974 | Capozza | 526/258 |
| 4,006,247 | 2/1977 | Panzer et al. | 526/263 |
| 4,109,072 | 8/1978 | Panzer et al. | 526/258 |
| 4,113,934 | 9/1978 | Panzer et al. | 526/258 |
| 4,129,532 | 12/1978 | Panzer et al. | 526/263 |

Primary Examiner—Harry Wong, Jr.
Attorney, Agent, or Firm—Paul W. Leuzzi, II

[57] ABSTRACT

2-Alkenylimidazoles or the corresponding 1,3-dialkyl-2-alkenylimidazolium salts are homo- or copolymerized employing free radical catalysts.

9 Claims, No Drawings

HOMOPOLYMERS AND COPOLYMERS OF 2-ALKENYLIMIDAZOLE OR ITS 1,3-DIALKYL-2-ALKENYLIMIDAZOLIUM SALTS

BACKGROUND OF THE INVENTION

The use of high-efficiency products in the treatment of aqueous suspensions of particulate, solid, water-insoluble materials has become increasingly prevalent in recent years. Industry is therefore continually searching for new systems which can be employed to facilitate the dewatering of awueous suspensions of organic and inorganic materials in water and waste water treatments, mineral processing, paper manufacture, and the like.

Recently, polymeric compositions based on imidazoline monomers have been introduced for the treatment of such suspensions. However, these imidazoline-based polymers fail to retain their effectiveness at high pH due to hydrolytic instability. The difficulties inherent in the use of the polymers produced from imidazoline monomers are largely overcome by the employement of chemically related 2-vinylimidazole polymers and their method of prepration as disclosed by Lawson in U.S. Pat. No. 2,710,870 and as later modified by Overberger as disclosed in the Journal of Polymer Science, Polymer Letter Edition Vol. 11, p. 465 (1973). While the use of these 2-vinylimidazole polymers overcomes the problems of stability inherent in the employment of the imidazoline polymers, these 2-vinylimidazole polymers per se do not possess the requisite charge to enable these compositions to be very effective for the treatment of such suspensions. Thus, there exists the need for other novel monomers capable of forming polymers effective in the treatment of aqueous particulate suspensions.

SUMMARY OF THE INVENTION

The present invention provides for homopolymers or copolymers containing 2-alkenylimidazoles or the corresponding 1,3-dialkyl-2-alkenylimidazolium salts. These homo- and copolymers are useful in the treatment of aqueous particulate suspensions.

DETAILED DESCRIPTION OF THE INVENTION

In accordance with the present invention there is provided 2-alkenylimidazole or 1,3-dialkyl-2-alkenylimidazolium salt conataining polymer wherein the 2-alkenylimidazole monomer is of the general structure:

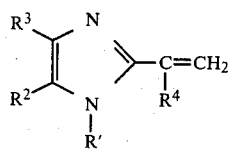

and the 1,3-dialkyl-2-alkenylimidazolium salt monomer is of the general structure:

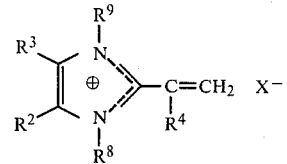

wherein $R^1$ is hydrogen or a saturated aliphatic radical having one to five carbon atoms, inclusive; $R^2$ and $R^3$ are individually selected from the group consisting of hydrogen, a saturated aliphatic radical having one to five carbon atoms, inclusive, and phenyl; $R^4$ is hydrogen or methyl; $R^8$ and $R^9$ are individually selected from the group consisting of a saturated aliphatic or hydroxyaliphatic radical having one to five carbon atoms, inclusive, and an aryl radical having six to ten carbon atoms, inclusive; and $X^-$ is an anion, i.e., a negative salt forming ion or radical, preferably a halide.

Suitable 2-alkenylimidazoles useful in the polymers of the instant invention can be prepared according to the processes set forth in copending Applications Ser. Nos. 163,918 and 164,115, both filed June 30, 1980, hereby incorporated herein by reference. Suitable 1,3-dialkyl-2-alkenylimidazolium salts can be prepared according to the process set forth in copending Application Ser. No. 163,917, filed June 30, 1980, hereby incorprated herein by reference.

The 2-alkenylimidazole or its 1,3-dialkyl-2-alkenylimidazolium salt monomers may be homopolymerized utilizing free radical catalyts; for example, benzoyl peroxide, azobisisobutronitrile, acetylperoxide, phthalylperoxide, t-butylhydroperoxide, cumene hydroperoxide, ammonium persulfate, potassium monopersulfate, 2,2'-azobis-(2-amidinopropane), potassium persulfate-sodium metabisulfite, sodium bromate-sodium sulfite, t-butyl hydroperoxide-sodium metabisulfite, and the like.

The monomers may be copolymerized with one, two or any desired number of comonomers or other 2-alkenylimidazoles or 1,3-dialkyl-2-alkenylimidazolium salts, the particular number involved depending on the particular application to which the resultant copolymer is intended. When comonomers are used, they may be employed in amounts ranging from about 1 to 99%, by weight, based on the total monomer charge, the preferred range being between about 25 to 98%.

Examples of useful comonomers which may be copolymerized, preferably under conventional polymerization conditions, include the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g.m styrene, o-, m-, and p-chlorostyrenes, -bromostyrenes, -fluorostyrenes, -methylstyrenes, -ethylstyrenes, -cyanostyrenes, the various poly-substituted styrenes, such as the various di-, tri-, and tetrachlorostyrenes, -bromostyrenes, -fluorostyrenes, -methylstyrenes, -ethylstyrenes, -cyanostyrenes, etc., vinylnaphthalene, vinylcyclohexane, vinylfurane, vinylpyridine, vinyldibenzofuran, divinylbenzene, trivinylbenzene, allylbenzene, diallylbenzene, N-vinylcarbazole, the various allylcuampsturemes, the various alpha-substituted styrenes and alpha-substituted ring-substitituted styrenes, e.g., alpha-methyl styrene, alpha-methyl-para-methyl styrene, etc.; unsaturated ethers, e.g., ethylvinylether, diallylether, ethylmethallyl ether, etc.; unsaturated amides, for instance, N-allylcaprolactam, acrylamide and N-substituted acrylamides, e.g., N-methylolacrylamide, N-allylacrylamide, N-methylacrylamide, N-phenylacrylamide, etc.; unsaturated ketones, e.g., methylvinylketone, methylallylketone, etc.; methylenemalonic esters, e.g., methylenemethyl malonate, etc.; ethylene, unsaturated polyhydric alcohol (e.g., butenediol, etc.) esters of saturated and unsaturated aliphatic and aromatic, monobasic and polybasic acids.

Other examples of monomers that can be copolymerized with the monomers ar the vinylhalides, more particularly vinylfluoride, vinylchloride, vinylbromide and vinyliodide, and the various vinylidenechloride, vinylidenebromide, vinylidenefluoride and vinylideneiodide—other comonomers being added if needed in order to improve the compatibility and copolymerization characteristics of the mixed monomers.

Other examples of monomers copolymerizable with the monomers of the instant invention include compounds such as acrylonitrile, and other compounds, e.g., the various substituted acrylonitriles (e.g., methacrylonitrile, ethacrylonitrile, phenylacrylonitrile, etc.), the acrylates and methacrylates including methyl, ethyl, butyl, octyl, etc., acrylate and methacrylate. Other monomers copolymerizable with the instant novel monomers are given, for example, in U.S. Pat. No. 2,601,572, dated June 24, 1952, where examples are given both by classes and species.

Homopolymer salts may be prepared via a plurality of mechanisms. The particular method employed is not critical if it is desired to prepare the homopolymer salt from the isolated monomer salt. In such case, the monomoer is merely contacted with an acid solution to form the corresponding salt which may then be isolated and polymerized.

The homopolymers and copolymers of the instant invention find use in a variety of applications. The single, most important use of these homopolymers and copolymers is as water-treatment additives, i.e., flocculation aids and the like generally used to facilitate the dewatering of aqueous suspension of organic and/or inorganic materials. Specific examples of such applications include, but are not limited to activated sludge dewatering, raw and primary sludge dewatering, coal refuse and fine coal filtration, dewatering of papermaking wastes, dewatering of fermentation wastes, mineral ore filtration and dewatering. Additionally, these homopolymers and copolymers are useful in various papermaking processes such as in the preparation of corrugating mediums and various kraft papers.

Whereas the exact scope of the instant invention is set forth in the appended claims, the following specific examples illustrate certain aspects of the present invention, and more particularly, point out methods of evaluating the same. However, the examples are set forth for illustration only and are not to be construed as limitations on the present invention except as set forth in the appended claims. All parts and percentages are by weight unless otherwise specified.

EXAMPLE 1

Bulk Polymerization of 1,3-Dimethyl-2-vinylimidazolium Methosulfate

To a reactor there are charged 5.0 parts of 1,3-Dimethyl-2-vinylimidazolium methosulfate and 5 to 6 parts of absolute methanol. After purging with nitrogen for one hour, 1500 ppm of 2,2'-azobis-(2,4-dimethylvaleronitrile) based on monomer is added. The reactor is then lowered into a 50° C. bath and held there overnight. A transparent solid polymeric product is obtained which is completely water soluble.

EXAMPLE 2

Copolymerization of 1,3-Dimethyl-2-vinylimidazolium Methosulfate with Acrylamide A copolymer containing 90 mole % acrylamide and 10 mole % 1,3-dimethyl-2-vinylimidazolium methosulfate is prepared by charging into a reactor 22.2 parts of 50% acrylamide solution of 7.8 parts of a 50% solution of 1,3-dimethyl-2-vinylimidazolium methosulfate and 18.0 parts of water. After mixing and adjusting the pH to 4-5, the reactor is sealed and the contents of the reactor sparged with $N_2$ for one hour while slowly heating to 50° C. After 1 hour, 250 ppm of 2,2'-azobis-(2-amidinopropane) hydrochloride is added and the contents allowed to polymerize overnight at 50° C. The product is obtained as a stiff gel soluble in water. A standard viscosity is obtained by preparing a solution containing 0.1% polymer solids, adding salt to make the solution 1 N in solution chloride, adjusting the pH to 5.5 and measuring the viscosity of this solution on a Brookfield LVT viscometer with U.L. adapter at 60 rpm. and is found to be 2.0 to 2.8 cps.

EXAMPLE 3

Emulsion Copolymerization of 1,3-Dimethyl-2-vinylimidazolium Methosulfate and Acrylamide A polymer containing 90 mole % acrylamide and 10 mole % 1,3-dimethyl-2-vinylimidazolium methosulfate is prepared following the inverse emulsion technique described in U.S. Pat. No. 4,152,200, Comparative Example A. A product with a standard viscosity equal to 1.6–2.8 cp. is accordingly prepared.

EXAMPLE 4

Copolymerization of 1,3-Dimethyl-2-vinylimidazolium Methosulfate with Styrene

To a reactor there are charged 7.6 parts of styrene and 2.4 parts of 1,3-dimethyl-2-vinylimidazolium methosulfate along with 5 parts of methanol. The reactor is sealed and purged with nitrogen for one hour and 2200 parts per million of 2,2'-azobis-(2,4-dimethylvaleronitrile) are added. The reactor is then immersed in a 50° C. bath for 24 to 48 hours to produce a cream colored, soft solid copolymer.

EXAMPLE 5

Copolymerization of 1,3-Dimethyl-2-Vinylimidazolium Methosulfate with Acrylonitrile To a reactor there are charged 1.9 parts of acrylonitrile, 8.2 parts of 1,3-dimethyl-2-vinylimidazolium methosulfate and 5 parts of methanol. After purging with nitrogen for one hour, 1500 parts per million of 2,2′-azo-bis-(2,4-dimethylvaleronitrile) is added and the vessel is immersed in a 50° C. bath for 24 to 48 hours to produce a soft, amber colored gel copolymer.

EXAMPLES 6-19

When the 1,3-dialkyl-2-alkenylimidazolium salts set forth in Table I below are employed in the polymerization or copolymerization reactions of Examples 1–5, homopolymers or copolymers are produced which are consistent with the spirit of the invention.

TABLE I

| Example | 1,3-Dialkyl-2-alkenylimidazolium Salt Monomers |
|---------|-----------------------------------------------|
| 6 | 1,3-dimethyl-2-vinylimidazolium chloride |
| 7 | 1,3-dibenzyl-2-vinylimidazolium chloride |
| 8 | 1,3-dimethyl-2-vinylimidazolium iodide |
| 9 | 1,3-dibenzyl-2-vinylimidazolium chloride |
| 10 | 1,3-diethyl-2-vinylimidazolium ethyl sulfate |
| 11 | 1,3-dimethyl-2-vinylimidazolium methylsulfate |
| 12 | 1,3-di-(beta-hydroxyethyl)-2-vinylimidazolium sulfate |
| 13 | 1-methyl-2-vinyl-3-butylimidazolium bromide |
| 14 | 1,3-dimethyl-2-vinylimidazolium chloride |
| 15 | 1-methyl-2-vinyl-3-benzylimidazolium chloride |
| 16 | 1-ethyl-2-vinyl-3-benzylimidazolium iodide |
| 17 | 1,3-dimethyl-2-isopropenylimidazolium bromide |
| 18 | 1,3,4,5-tetramethyl-2-vinylimidazolium chloride |
| 19 | 1,3-dimethyl-4,5-diphenyl-2-vinylimidazolium methylsulfate |

We claim:

1. A homopolymer containing 1,3-dialkyl-2-alkenylimidazolium salt monomers wherein the 1,3-dialkyl-2-alkenylimidazolium salt monomer is of the general structure:

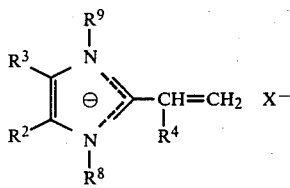

wherein $R^2$ and $R^3$ are individually selected from the group consisting of hydrogen, a saturated aliphatic radical having one to five carbon atoms, inclusive, and phenyl; $R^4$ is hydrogen or methyl; $R^8$ and $R^9$ are individually selected from the group consisting of a saturated aliphatic or hydroxyaliphatic radical having one to five carbon atoms, inclusive, and an aryl radical having six to ten carbon atoms, inclusive; and X is a negative salt-forming ion.

2. A copolymer containing 1,3-dialkyl-2-alkenylimidazolium salt monomers wherein 1,3-dialkyl-2-alkenylimidazolium salt monomer is of the general structure:

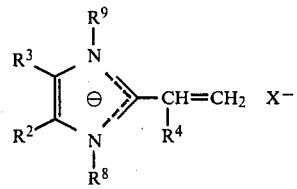

wherein $R^2$ and $R^3$ are individually selected from the group consisting of hydrogen, a saturated aliphatic radical having one to five carbon atoms, inclusive, and phenyl; $R^4$ is hydrogen or methyl; $R^8$ and $R^9$ are individually selected from the group consisting of a saturated aliphatic or hydroxyaliphatic radical having one to five carbon atoms, inclusive, and an aryl radical having six to ten carbon atoms, inclusive; and X is a negative salt forming ion.

3. The polymers of claims 1 or 2 wherein the 1,3-dialkyl-2-alkenylimidazolium salt is 1,3-dimethyl-2-vinylimidazolium chloride.

4. The polymer of claims 1 or 2 wherein the 1,3-dialkyl-2-alkenylimidazolium salt is 1,3-dimethyl-2-vinylimidazolium methylsulfate.

5. The polymer of claims 1 or 2 wherein the 1,3-dialkyl-2-alkenylimidazolium salt is 1,3-dimethyl-2-isopropenylimidazolium chloride.

6. The polymer of claims 1 or 2 wherein the 1,3-dialkyl-2-alkenylimidazolium salt is 1,3,4(5)-trimethyl-2-vinylimidazolium chloride.

7. The polymer of claims 1 or 2 wherein the 1,3-dialkyl-2-alkenylimidazolium salt is 1-methyl-2-vinyl-3-(beta-hydroxyethyl)imidazolium sulfate.

8. The copolymer of claim 2 wherein the 1,3-dialkyl-2-alkenylimidazolium salt monomer is copolymerized with an ethylenically unsaturated comonomer.

9. The copolymer of claim 8 wherein the ethylenically unsaturated comonomer is selected from the group consisting of acrylamide, acrylonitrile, methylmethacrylate and styrene.

* * * * *